(12) United States Patent
Algorry et al.

(10) Patent No.: US 12,513,061 B2
(45) Date of Patent: Dec. 30, 2025

(54) OPERATIONAL RISK MANAGEMENT OF IT ASSETS AND SYSTEMS

(71) Applicant: JP Morgan Chase Bank, N.A., New York, NY (US)

(72) Inventors: David Gabriel Algorry, Caba (AR); Kostis Gourgoulias, London (GB); Sean Moran, London (GB); William Joel Guest, Conroe, TX (US); Bruce Peikon, East Northport, NY (US); Srinivas Kati, Lewis Center, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 5 days.

(21) Appl. No.: 18/420,572

(22) Filed: Jan. 23, 2024

(65) Prior Publication Data

US 2025/0193093 A1    Jun. 12, 2025

(30) Foreign Application Priority Data

Dec. 11, 2023  (GR) .............................. 20230101022

(51) Int. Cl.
| | |
|---|---|
| *H04L 41/5074* | (2022.01) |
| *H04L 9/40* | (2022.01) |
| *H04L 41/082* | (2022.01) |
| *H04L 41/16* | (2022.01) |

(52) U.S. Cl.
CPC ........ *H04L 41/5074* (2013.01); *H04L 41/082* (2013.01); *H04L 41/16* (2013.01); *H04L 63/1433* (2013.01)

(58) Field of Classification Search
CPC ... H04L 41/5074; H04L 41/082; H04L 41/16; H04L 63/1433
USPC ........................................................ 709/224
See application file for complete search history.

(56) References Cited

U.S. PATENT DOCUMENTS

| | | | |
|---|---|---|---|
| 11,916,746 B1* | 2/2024 | Golla | H04L 41/5009 |
| 2020/0004752 A1* | 1/2020 | Majumdar | G06F 16/28 |
| 2020/0382546 A1* | 12/2020 | Henderson | G06F 40/177 |
| 2021/0103929 A1* | 4/2021 | Cheng | G06Q 20/102 |
| 2022/0255875 A1* | 8/2022 | Wang | H04L 47/24 |
| 2022/0400131 A1* | 12/2022 | Shao | G06N 3/0455 |
| 2023/0102786 A1* | 3/2023 | Garapati | G06N 20/20 706/50 |
| 2023/0396538 A1* | 12/2023 | Kotrabasappa | H04L 45/42 |

* cited by examiner

*Primary Examiner* — Ario Etienne
*Assistant Examiner* — Kidest Mendaye
(74) *Attorney, Agent, or Firm* — Wood IP Law, LLC; Theodore A. Wood

(57) ABSTRACT

A risk classification processing circuit is configured to classify one or more subsets of network elements forming a given managed information technology network. The classification is based on weight values associated with respective ones of a set of classification decision indicators. A risk mitigation processing circuit is configured to cause risk mitigation acts to be carried out on one or more of the network elements forming the given managed information technology network. The risk mitigation processing circuit includes an allocation circuit configured to make processing resources available to process the risk mitigation acts based on the classification by the risk classification processing circuit.

14 Claims, 8 Drawing Sheets

- assetname => c141039-018y502a
- configuration => Corporate - Terminal Server
- primaryDNSName => c141039-018y502a.net.amer.jpmchase.net
- deviceRoleCD => CORPTS
- manufacturer => CISCO
- model => CISCO2921-SEC/K9
- primaryip => 10.130.130.11
- deviceFunction => ROUTER
- supportteamname => GNS CORPORATE
- LocationID => 41039
- productClass => ROUTER
- verumidentifier => 1285926
- site => New York, 383 Madison Ave
- dcZone => NAMR

| configuration | Initial weight value |
|---|---|
| Data Center - DMZ - EComm | 2 |
| Data Center - DMZ - EServices | 6 |
| Network Services - Firewall - Ecommerce Internal | 5 |
| Network Services - Firewall - Ecommerce External | 4 |
| Application Deployment Services - Load Balancing | 23 |
| ... | ... |
| Data Center - DMZ - Eservices CPO | 175 |
| Corporate - Isolated Switch | 170 |
| Retail - No Fault Monitoring | 181 |
| Data Center - Tools Concentrator | 178 |
| WAN - Transport | 182 |

77 →
74 →

| deviceFunction | Initial weight value |
|---|---|
| Load Balancer | 1 |
| Firewall | 2 |
| Virtual Firewall | 3 |
| Network Analyzer | 4 |
| Content Server | 5 |
| Proxy | 6 |
| Application Switch | 7 |
| Router | 8 |
| Spine Switch | 9 |
| L3 Switch | 10 |
| Leaf Switch | 11 |
| Switch | 12 |

78 → 75 →

| supportTeamName | Initial weight value |
|---|---|
| GNS Internet Connectivity | 1 |
| GNS Load Balancing | 2 |
| GNS Firewall | 3 |
| GNS Network & Security Services | 4 |
| GNS WAN | 5 |
| GNS Data Center | 6 |
| GNS Server Farm | 7 |
| GNS Corporate | 8 |
| GNS Business Partner | 9 |
| GNS Retail | 10 |

FIG. 3

Example Scaling Process

OPERATIONAL RISK MANAGEMENT OF IT ASSETS AND SYSTEMS

CROSS-REFERENCE TO RELATED APPLICATION

This application claims benefit to Greek Patent Application No. 20230101022, filed Dec. 11, 2023, which is incorporated herein in its entirety by reference.

FIELD OF THE DISCLOSURE

Aspects of the present disclosure are related to operational risk management of information technology (IT) assets and networks.

BACKGROUND OF THE DISCLOSURE

IT systems are managed to ensure continuous operation and minimize operational risks. Operational risks involve the risk of loss caused by disruptions to operations, arising from weaknesses in technology, the network, or network devices. Organizations typically manage operational risk by employing a ticket handling process. With this process, an IT organization addresses, among other things, operational risk events such as outdated hardware, outdated software, an unsecured part of a network, cyberthreats, and zero-day exploits, i.e., vulnerabilities in software for which there are no known patches or fixes available. Asset management and ticket handling for a given organization may be performed, for example, in accordance with the Information Technology Infrastructure Library (ITIL) which is a framework of best practices for IT service management (ITSM). ITSM software may be employed by a given IT services team to, for example, formalize and automate ticket routing, assignment, and status updates.

SUMMARY OF THE DISCLOSURE

Given the aforementioned deficiencies, what is needed therefore, are systems and methods to improve the timely protection against or mitigation of operational risks in an IT system, such as a network.

An objective of the present disclosure is to improve on the ability to timely carry out risk mitigation actions including one or more of repair, replacement, updating, patching, augmentation, reconfiguration, or removal of a network or one or more hardware or software devices in such a network.

Another objective of the present disclosure is to prevent zero-day exploits, i.e., exploits of vulnerabilities in the IT system that were previously unknown to anyone capable of mitigating against the vulnerabilities.

A further objective of the present disclosure is to cause the timely mitigation against incidents such as performance issues and disruptions to operations especially when such mitigation action is not strictly reactive to, or timed based upon, external prompts for operational risk mitigation actions. Such external prompts may occur, for example, when incidents have occurred such as performance issues or disruptions to operations, or when tickets are prompted via a ticket handling system in response to update releases or reports of known or suspected cyberthreats or reports of known or suspected vulnerabilities.

A further objective of the present disclosure is to cause timely mitigation actions to mitigate incidents such as performance issues and disruptions to operations, where the mitigation actions occur to one or more selected network devices, based on factors other than the above-described external prompts for operational risk mitigation actions. Such factors may include the relative importance of a given device to the proper operation of the network or historical experiences with disruptions or system function issues related to a given device. Such factors may change dynamically.

One or more alternate or additional objectives may be served by the present disclosure, for example, as may be apparent in the following description. Embodiments of the disclosure include any apparatus, machine, system, method, articles (e.g., computer-readable media encoded to cause certain acts), or any one or more sub-parts or sub-combinations of such apparatus (singular or plural), system, method, or article (or encoding thereon or therein), for example, as supported by the present disclosure. Embodiments herein also contemplate that any one or more processes as described herein may be incorporated into a processing circuit.

In the embodiments, a risk classification processing circuit is configured to classify one or more subsets of network elements forming a given managed information technology network. The classification is based on weight values associated with respective ones of a set of classification decision indicators. A risk mitigation processing circuit is configured to cause risk mitigation acts to be carried out on one or more of the network elements forming the given managed information technology network. The risk mitigation processing circuit includes an allocation circuit configured to make processing resources available to process the risk mitigation acts based on the classification by the risk classification processing circuit.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

DESCRIPTION OF THE DRAWINGS

Illustrative embodiments may take form in various components and arrangements of components. Illustrative embodiments are shown in the accompanying drawings. The drawings are only for the purpose of illustrating the embodiments and are not to be construed as limiting the disclosure. Given the following enabling description of the drawings, the novel aspects of the present disclosure should become evident to a person of ordinary skill in the relevant art(s).

FIG. 2 is a diagram of an example inventory record according to the embodiments;

FIG. 3 provides a few example relevant attributes from the inventory record data, namely, configuration, device-Function, and supportTeamName;

DETAILED DESCRIPTION

Figure 1:
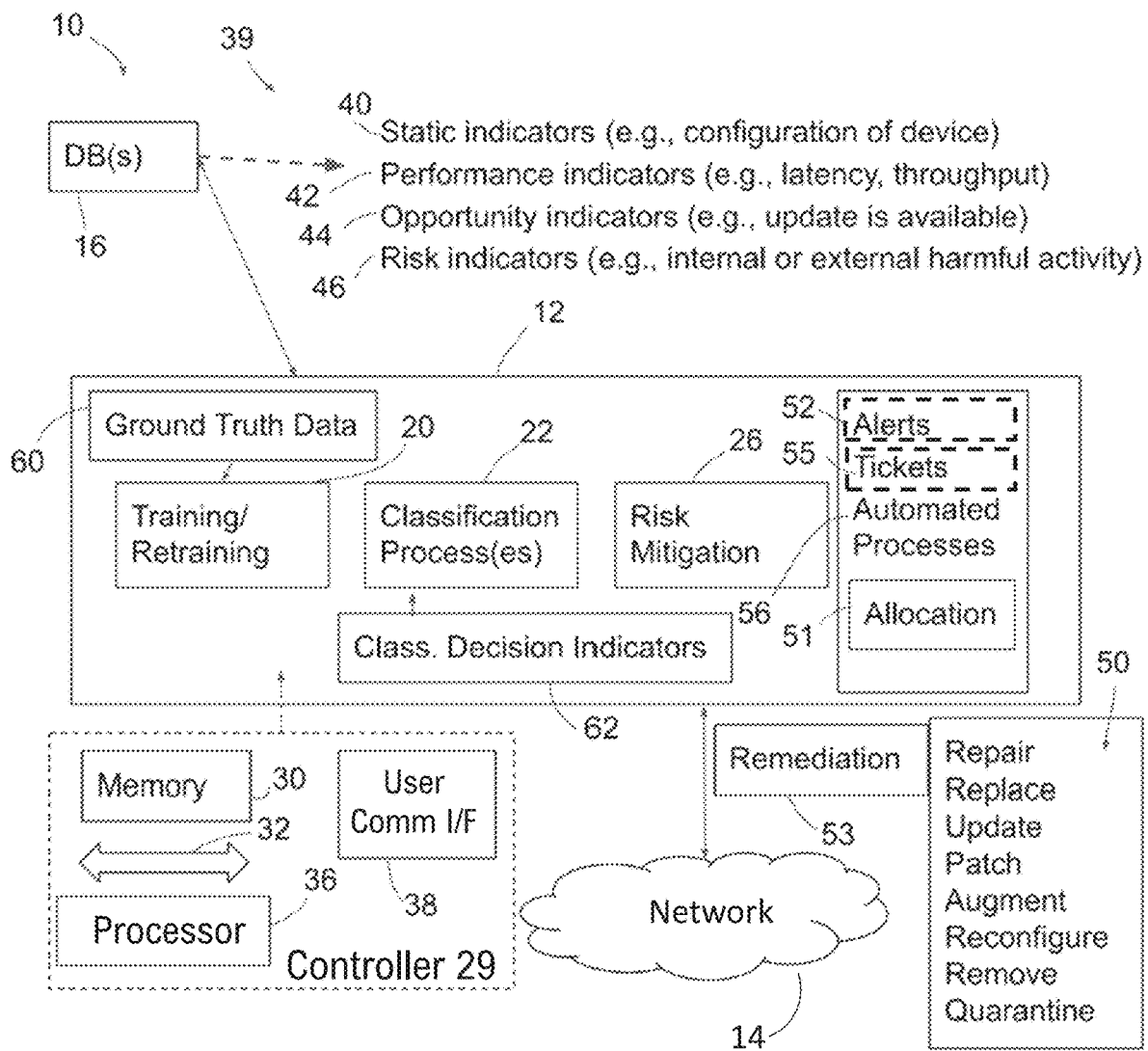
FIG. 1 is a block diagram of an embodiment of a network management system according to the embodiments of the present disclosure.

In accordance with one or more embodiments herein, various terms may be defined as follows.

Application program. An application program is a program that, when executed, involves user interaction, whereas an operating system program, when executed, serves as an interface between an application program and underlying hardware of a computer. Any one or more of the various acts described below may be carried out by a program, e.g., an application program and/or operating system program.

Attribute: A variable, for example, a quantitative or qualitative characteristic of an item. See "feature" below. As an example, "color" is an attribute, while "color is blue" is a feature.

Device or network device: An IT asset that is an entity on a network, which entity may be a hardware device, a process, a program, or a mix of one or more hardware devices and one or more processes running on one or more hardware devices (e.g., with distributed processing). Examples of devices include computers, servers, routers, switches, software, virtual entities, and mobile devices. Also, a device or network device may be a virtualized physical resource, for example, software run on one or more servers for carrying network control and/or data transfer. The network or portions of the network may be one or a plural set of software defined networks.

Disruption: A disturbance or problem with an IT network which interrupts an event, activity, or process.

Feature: A value or information of an attribute. See "attribute" above. As an example, "color" is an attribute, while "color is blue" is a feature.

Ground truth: Information that is real or true, i.e., information from empirical evidence.

IT network or network: An interconnection of devices using connection-oriented and/or connectionless, usually encapsulated, communications, for example, with frame relay and other types of encapsulation protocols, in the form of one or more layers. A software defined network is a type of IT network.

Network element: An element forming part of an interconnected IT network.

Operational risk: Risk of a disruption to a network element.

Processing circuit: A processing circuit may include both (at least a portion of) computer-readable media carrying functional encoded data and components of a computer controller (e.g., an operable computer). The computer controller is capable of executing (or is already executing) the functional encoded data, and thereby is configured when operable to cause certain acts to occur. A processing circuit may also include: a machine or part of a machine that is specially configured to carry out a process, for example, any process described herein; or a special purpose computer or a part of a special purpose computer.

A processing circuit may also be in the form of a general purpose computer running a compiled, interpretable, or compliable program (or part of such a program) that is combined with hardware carrying out a process or a set of processes. The processing circuit may further be implemented in the form of an application specific integrated circuit (ASIC), part of an ASIC, or a group of ASICs. The processing circuit may further include an electronic circuit or part of an electronic circuit. The processing circuit does not exist in the form of code per se, software per se, instructions per se, mental thoughts alone, or processes that are carried out manually by a person without any involvement of a machine.

Program: A program includes software of a processing circuit.

Static indicators: Data pertaining to a network device that describes the device and its specifications, for example, configuration, implementation, device function, and so on. Static indicators may be provided in inventory records of an IT network.

User interface tools; user interface elements; output user interface; input user interface; input/output user interface; and graphical user interface tools. User interface tools are human user interface elements which allow human user and machine interaction, whereby a machine communicates to a human (output user interface tools), a human inputs data, a command, or a signal to a machine (input user interface tools), or a machine communicates, to a human, information indicating what the human may input, and the human inputs to the machine (input/output user interface tools).

Graphical user interface tools (graphical tools) include graphical input user interface tools (graphical input tools), graphical output user interface tools (graphical output tools), and/or graphical input/output user interface tools (graphical input/output tools). A graphical input tool is a portion of a graphical screen device (e.g., a display and circuitry driving the display) configured to, via an on-screen interface (e.g., with a touchscreen sensor, with keys of a keypad, a keyboard, etc., and/or with a screen pointer element controllable with a mouse, toggle, or wheel), visually communicate to a user data to be input and to visually and interactively communicate to the user the device's receipt of the input data.

A graphical output tool is a portion of a device configured to, via an on-screen interface, visually communicate to a user information output by a device or application. A graphical input/output tool acts as both a graphical input tool and a graphical output tool. A graphical input and/or output tool may include, for example, screen displayed icons, buttons, forms, or fields. Each time a user interfaces with a device, program, or system in the present disclosure, the interaction may involve any version of user interface tool as described above, e.g., which may be a graphical user interface tool.

Referring now to the drawings in greater detail, FIG. 1 shows a block diagram of a network management system 10 for managing one or more networks, such as network 14. The network 14 may comprise one, or a combination of, internet protocol network connections with connection-oriented and/or connection-less packet delivery, and packet switched, for example, frame relay, network connections.

A set of intelligent risk processing circuits 12 is coupled with one or more data sources, e.g., databases 16, and with network 14. In the illustrated embodiment, the processing circuits 12 collectively or individually include, or executed within, a computer controller 29. The computer controller 29 (illustrated in greater detail in FIG. 8), may include a memory 30, one or more bus structures 32, at least one processor 36, and a user communications interface 38. The processing circuits 12 include a training circuit 20, one or more classification circuits 22, and a risk mitigation circuit 26. Per one embodiment, the circuits 20, 22, and 26 are processes running on one server.

The training circuit 20 performs training for the one or more classification processes being carried out by classification circuit 22. The risk mitigation circuit 26 causes mitigation acts to be performed with an alerts generator 52, a ticketing processor 55, and/or via automated processes 56. For automated risk mitigation, an allocation circuit 51 may be provided that is configured to make processing resources in the network 14 (or of the server of the processing circuits 12) available to process select risk mitigation acts 50 for a given network device or element. The allocation may occur in a particular place in a queue or at a particular time, based on the classification by the risk classification circuit 22.

The risk mitigation circuit 26 may comprise an alert generator configured to cause alerts to be generated to prompt one or more remediation circuits 53 to carry out one or more remediation processes.

In one embodiment, risk mitigation circuit 26 comprises the one or more remediation circuits 53 and is configured to carry out one or more remediation processes. In one embodiment, the alerts generator 52 comprises the ticketing processor 55.

In one embodiment, the training circuit 20 serves to train, retrain, and refine classification by the classification circuit 22, which makes priority decisions based on priority decision indicators taken from available assessment data 39. More specifically, the training circuit 20 may use ground truth data, e.g., performance indicators 42, opportunity indicators 44, and/or risk indicators 46, to train the way the classification circuit 22 considers and uses certain classification decision indicators 62 in its classification determination.

Per one embodiment, the classification processing circuit 22 makes classification decisions based on classification decision indicators primarily comprising static indicators 40. By using this data for its classification decision indicator data, the classification processing circuit 22 can effectively be used for triage of operational risk management resources.

For example, as one benefit, among others not specifically stated herein, the static indicators 40 are available early without waiting for data relying on outside events which might become available too late, for example, when a decline in performance has already occurred (the performance indicators 42), a system breach has occurred (the risk indicators 46), or an opportunity for a protective update has been announced (opportunity indicators 44). With early knowledge, certain types of operational risks that would benefit from early intervention such as zero-day exploits may be prevented.

Another example benefit is that certain network devices may play a more critical role in causing or preventing disruptions if subject to risk remediation measures with priority over other known or possible risks. It is possible to identify these types of network devices using static indicators. For example, ecommerce data centers, identifiable as such with static indicators, can be vital in certain contexts, for example, where online payments occur. These network devices may host web interface and backend processes required for online market exchanges.

In addition, with ecommerce data centers, there may be a desire to ensure 24/7 connectivity and uptime. It may also be important to provide enhanced security, per regulatory mandates, for example, to prevent fraudulent transactions. Unfettered ecommerce can also minimize customer hassle and facilitate online business relationships.

The classification circuit 22 may be configured to classify network risk management tasks in levels of importance. In one embodiment, each risk management task has a ranked level of importance. In a more specific embodiment, the ranks are specified so there are no ties. The risk management tasks may be identified in terms of the network elements being attended to, e.g., on a per network device basis.

Some ranking techniques that may be employed by the classification circuit 22 include, for example, a naive Bayes classifier technique. The naive Bayes classifier technique is a supervised learning classification algorithm. Another type of ranking technique is a weighted decision matrix. With a weighted decision matrix, options (here, individual network devices) are listed as rows in a table. Factors are listed as columns. For each option, scores are given to the factors. The scores are then added up for an overall score for each option, which is used to determine a relative ranking for that option.

In another embodiment, classification circuit 22 carries out machine-learned ranking (MLR). A supervised or unsupervised MLR algorithm may be employed. With an unsupervised MLR technique, unlabeled or raw data is processed to determine a priority ranking. With a supervised MLR technique, labeled input and output training data is required. Pointwise, pairwise, and listwise MLR approaches are possible embodiments. With MLR, model parameters are fine-tuned automatically by combining multiple pieces of evidence. An MLR approach avoids issues with over-fitting.

In one embodiment, a pairwise MLR approach is used. More specifically, in the embodiment described in more detail hereinbelow, a RankNet pairwise ranking technique is used. More particularly, the LamdaRank technique is employed.

A classification is obtained setting forth levels of importance for performing remediation acts on different network devices, which classification may be a per-device ranking.

With the classification complete, a priority scheduling technique may be employed by the risk mitigation circuit 26, by which tasks are scheduled. Preemptive scheduling or non-preemptive scheduling may be performed. With preemptive scheduling, processes are given a limited amount of time. With non-preemptive scheduling, a processor is allocated to the process until it terminates or switches states. Per a round-robin technique, which may be based upon a preemptive algorithm, tasks are executed in a circular order with all processes treated with an equal priority. Each task is given a fixed amount of time, called a quantum.

Alternatively, a priority scheduling technique may be employed, which executes tasks in descending order of their priority. With non-preemptive priority scheduling, tasks are ticketed or carried out in descending order of priority. With preemptive priority scheduling, tasks are ticketed or carried out in descending order of priority but with each task being given a limited amount of time.

In some embodiments, some risk mitigation tasks, e.g., remediation with certain network devices, might not require prioritization, and could be ticketed/processed in circular order, for example, with a round robin technique.

The one or more remediation processes, performed example by the remediation circuits 53, comprise one or more of a range of processes, including update, patch, and replacement processes, repair of a network element, removal of a network element, and augmenting the network with one or more additional network elements. Further remediation processes include removing a network element and quarantining a network element.

With supervised MLR, the ranking and loss functions may be defined in the following paragraphs.

Objects. Suppose $o=\{o1, \ldots, on\}$ represents a set of selected (queried) objects to be ranked. In the embodiments herein, the objects are network devices for which remediation may be scheduled. Scores. Multi-level ratings, i.e., scores, may be represented by L={l(1), ..., l(n)}, where l(i) is an element of the set {l(1), ..., l(n)}, and a given value l(i) is a rating that corresponds a given object xi. The scores are rankings of the objects, in that if l(i)>l(j), then oi should be ranked before oj. Function. If F is the function class, f, which is an element of the function class F, is a ranking function. The optimal ranking function is learned from training data by minimizing a certain loss function defined on the objects, their corresponding scores, and the ranking function.

Pairwise optimization functions learn item relevance scores by taking into account the order of items in the list. The goal of pairwise optimization is to maximize the scores of pairs of items rather than individual items. This enables the model to learn the relative relevance of the objects. RankNet and LambdaRank are two common pairwise optimization methods.

RankNet: RankNet is a neural network-based pairwise optimization function that employs backpropagation to learn the relevance ratings of items. RankNet learns the relevance scores by analyzing the relative order of pairs of items and updating the scores as necessary.

LambdaRank: LambdaRank is a pairwise optimization function that learns item relevance ratings using gradient descent. It is based on the concept of maximizing the change in the list's normalized discounted cumulative gain (NDCG) scores after exchanging the locations of two items. LambdaRank is frequently used in large-scale learning to rank scenarios.

In the embodiments, device ranks are obtained for the entire set of devices in the network 14, with no ties. A classification model, specifically a machine-learned ranking model, is trained using a combination of static indicators and ground truth data. Part of the training includes determining and optimizing the ranking and loss functions, in accordance with the LamdaRank optimization method in the illustrated embodiment.

FIG. 2 shows an example record from a network database. In the illustrated embodiment, a graph type database is used to store network data including operation data of the network devices. As well understood by those of skill in the art, graph databases represent data in the form of graphs depicting nodes, relationships, and properties which are used to store the data. In the embodiments, the graph type database may comprise a Verum database. By way of example only, and not limitation, other suitable graph databases may include Indegree, Outdegree, Pagerank, and Betweenness. More specifically, FIG. 2 shows a record for a given device from a basic inventory which is used to determine static indicators to be used to determine device ranking. This information was obtained from the properties of a device vertex in the graph database and includes a number of fields (attributes) 64 and associated values (features) 65 corresponding to a particular network device. These associated values 65 are unaltered static indicator values, meaning that they are in unaltered form, as stored in the record in the basic inventory. In the illustrated embodiment, the fields "configuration", "manufacturer", "model", "deviceFunction", "supporteamname", and "site" are chosen as the attributes whos values are deemed important for device rank.

Each selected field has a certain number of possible feature values, that are unaltered static indicator values that may be associated with the selected field. FIG. 3 provides a few examples of the selected fields from the inventory record data, namely, configuration 72, for which there are 182 possible unaltered static indicator values 73, device-Function 77, for which there are 12 possible unaltered static indicator values 74, and supportTeamName 78, for which there are 10 possible unaltered static indicator values 75. As shown in FIG. 3, for the selected fields, each possible unaltered value is assigned an initial weight manually (by user input) or programmatically. The weights are shown in the right column of the example displayed tables.

Lower initial weight values correspond to unaltered values of higher importance, while higher initial weight values correspond to unaltered values of lower importance. For the configuration attribute 72, unaltered values such as Data Center-demilitarized zone (DMZ)-Ecommerce (Ecomm), and others as shown, have relative high relevance/importance and are assigned lower initial weight values of 2, 6, 5, and 4. Lower importance values, with higher initial weight values between 175 and 182 include, for example, wide area network (WAN)-Transport. Similarly, for deviceFunction 77 and supportTeamName 78, the relative higher relevance/importance feature values have lower initial weight values, while the values of lower importance have higher initial weight values.

Figure 4:
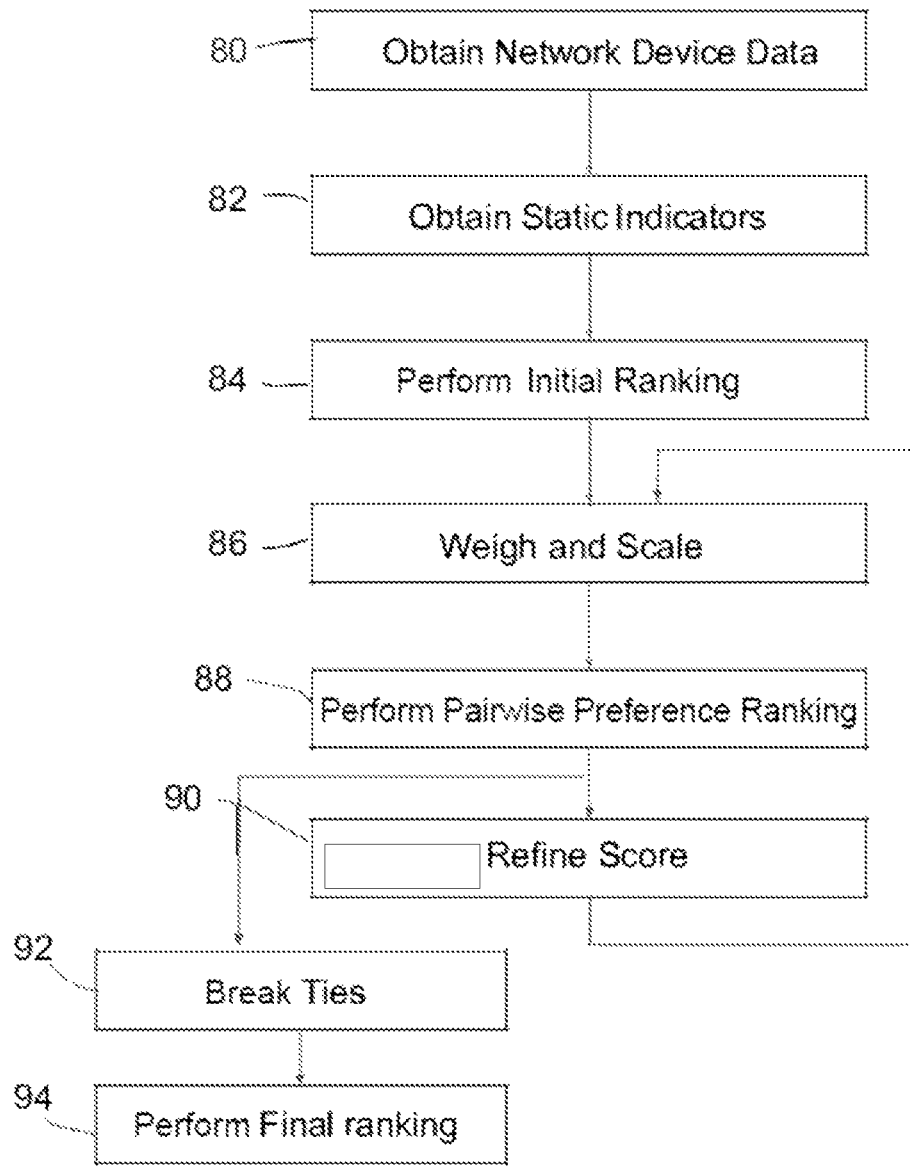
FIG. 4 is a flow chart of an example process of determining unique device rank indicating priority according to the embodiments.

FIG. 4 shows a flow chart of a process 79 of determining unique device ranks indicating priority. In an initial block 80, network device data is obtained. Then, in block 82, static indicators, are obtained from select fields and associated initial weight values. This may entail selecting the field types as explained above, and then assigning the initial weight values, with lower values representing more importance or relevance and therefore a higher potential rank. This is done for all the devices in the network, and the vertex of each device is updated to include the initial assigned weight values for the selected fields.

In block 84, for a given initial coarse training query, an initial ranking is set forth, manually in the illustrated embodiment. In the embodiment, by way of example only and not limitation, 50 devices are chosen randomly, and each ith chosen device is given a unique priority value priority (i), with i=1, ..., 50. Higher values such as 50 signify high priority devices, while lower values such as 1 signify lower priority devices.

In block 86, for the queried set of devices, the initial weight values for the selected fields are modified to provide revised weight values. That is, feature vectors $x_{qi}$ (q=0, i=1, ..., 50) are populated with revised weight values that are based on the selected fields and their corresponding initial weight values obtained from the queried devices' vertices. As explained further below with reference to FIG. 5, the revised weight values are determined by scaling and then further weighting the initial weight values.

Figure 5:
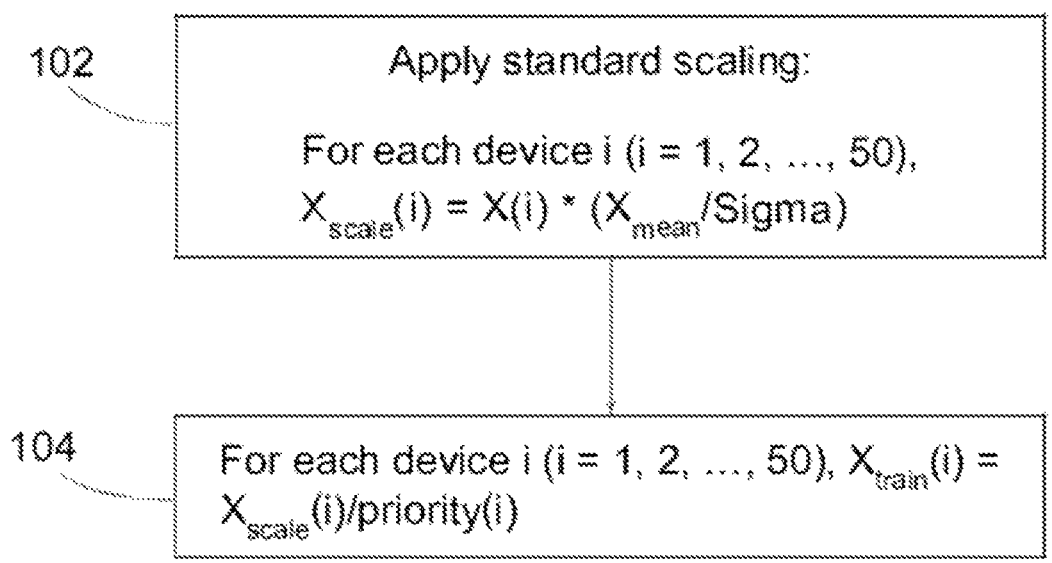
FIG. 5 is a flow chart of an example method of performing the scaling process depicted in FIG. 4.

FIG. 5 is a flow chart showing a scaling process. At block 102, a standard scaling is applied as follows. A given feature vector for a given device has 6 values in the illustrated embodiment. For each device i (i=1, 2, ..., 50), and for each value $x_j$ in the device's feature vector (j=1, ..., 6), the value $x_j$ is modified to be $x_{scale}(i)=x(i)*(x_{mean}/\text{sigma})$, where sigma is the standard deviation of x for the device and $x_{mean}$ is the mean of x among the initial ranking set, which is 50 devices in the illustrated embodiment.

At block 104, for each device i (i=1, 2, ..., 50), and for each value $x_j$ in the device's feature vector, $x_{train}(i)=x_{scale}(i)/\text{priority}(i)$, where the priority is a value between 1 and 50 indicating the unique rank initially assigned to the device i. If the priority value is lower, the variance will be higher.

Referring back to FIG. 4, after weighting and scaling at block 86, pairwise preference ranking is performed using the revised training data $x_{train}(i)$, using the resulting training feature vectors modified to comprise sets of revised weight values $x_{train}(i)$ as described above with reference to FIG. 5. Pairwise preference ranking produces a prediction of an entire set of rank values equal in number to the total number of devices in the network, for example, on the order of tens of thousands of devices. In this initial predicted ranking, the quality of the score values will be rough. Accordingly, with score refinement, in block 90, the rankings (scores) are corrected using the following approach, and then a new query is done for 50 additional devices and the process returns to block 86.

Figure 6:
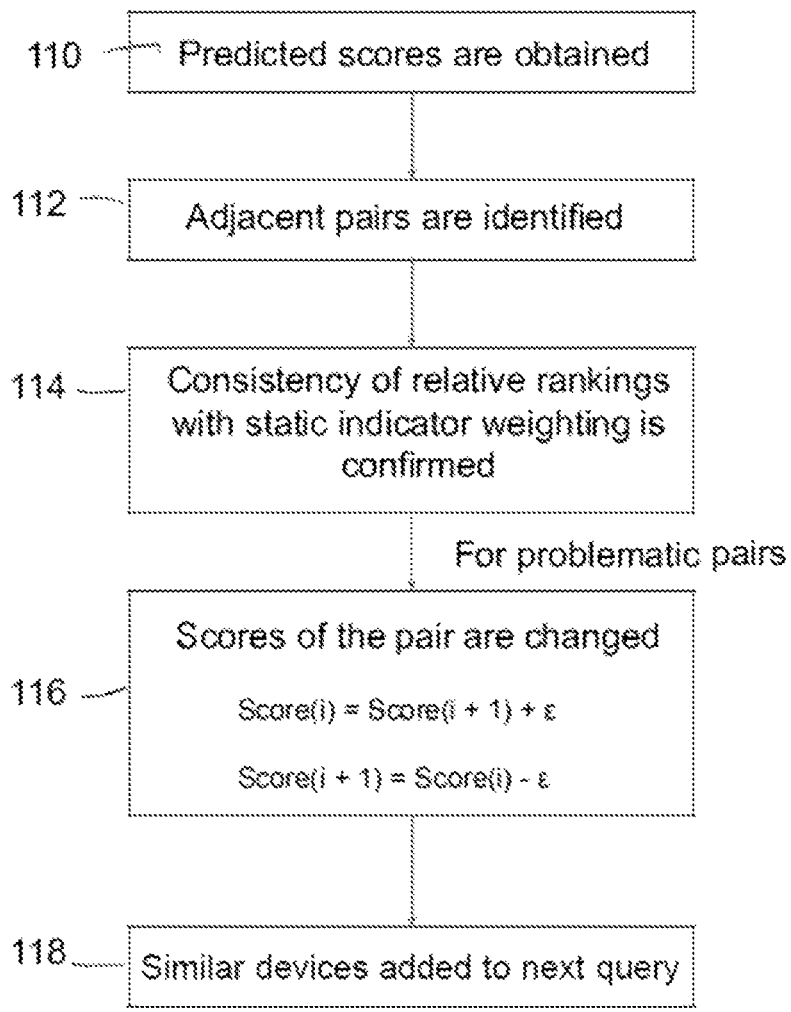
FIG. 6 is a flow chart of an example method of performing the scoring refinement process depicted in FIG. 4.

FIG. 6 is a flow chart of an example method of performing the scoring refinement process depicted in FIG. 4. With score refinement, per the flow chart shown in FIG. 6, at block 110, the predicted scores (the total set) are obtained from the LamdaRank process at block 88. Then, at block 112, pairs of devices in the ranking that are adjacent to each other are identified. At block 114, for each such pair, a determination is made to confirm that the higher ranked adjacent device has all its revised weight values in its feature vector with a lower value than the corresponding revised weight values of the feature vector of the adjacent lower-ranked device. When this occurs, at block 116, the scores of the pair are changed as follows, for i=(1, 2, . . . . M) where M is the total devices in the network:

$$Score(i) = Score(i+1) + \varepsilon$$

$$Score(i+1) = Score(i) - \varepsilon$$

where Score (i) is the score of a device in the position i, Score (i+1) is the Score of a device in the position i+1 right after the device 1, and ε is a small factor to avoid duplication with other device scores.

At block 118, pairs with similar revised static indicator profiles (feature vectors) to the ones adjusted in this score refinement step are added to new queries to be done in iterative refinement, and those added devices are combined to the training data for the next iteration.

Referring back to FIG. 4, the above is repeated until all problematic (wrongly ordered) pairs are adjusted. It is noted that when the number of pairs deemed problematic (wrongly ordered) based on this determination in the score refinement block becomes less than a given threshold (20 in one embodiment), then the process can proceed to tie breaking at block 92 and final ranking at block 94. If the problematic adjacent pairs equal or exceed the threshold, then the process returns to block 86 with the problematic devices added for the next query. Any corrected scores per this process are updated in the corresponding vertices of the devices. After scores refinement at block 90, score duplication is eliminated based on the primaryIP address by carrying out the following acts.

Figure 7:
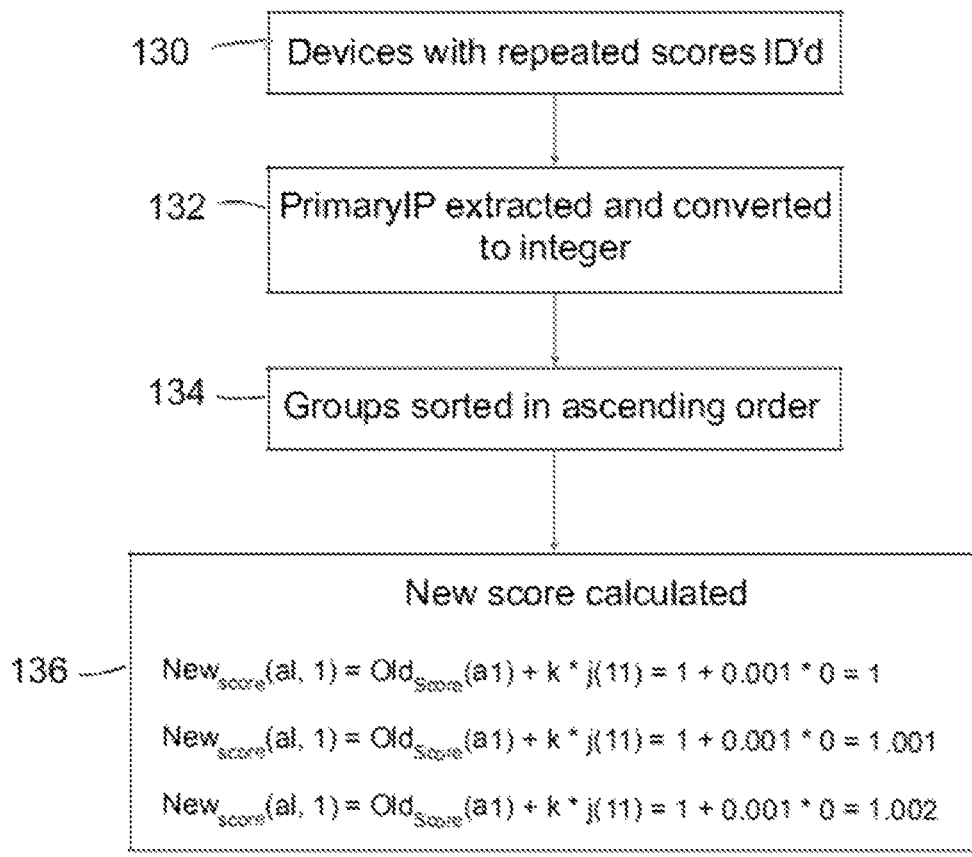
FIG. 7 is a flow chart of an example method of performing the tie breaking process depicted in FIG. 4.

FIG. 7 is a flow chart of an example method of performing the tie breaking ties process depicted in FIG. 4. At block 130, the devices are grouped by score, and the groups with more than one device are selected. This identifies the devices with repeated scores. At block 132, for each device with a repeated score, the primaryIP (int_IP) is extracted and transformed to an integer. At block 134, the grouped devices with repeated scores are sorted based on int_IP in ascending mode. At block 136, the new score ($New_{score}$) is calculated penalizing the original score ($Old_{score}$) based on the position of the device in the group j(j_IP) minus 1, times a small score multiplication factor k:

$$New_{score}(device, int_{IP}) = Old_{score}(device) + k^* (j(int_{IP})-1)$$

For example, when considering three devices (a1, a2, a3) with the same score ($Old_{score}=1$) and the integer of the primary internet protocol (IP) address are 11, 12, and 13, respectively, then:

$$New_{score}(a1,1) = OldScore(a1) + k^*j(11) = 1 + 0.001^*0 = 1$$

$$New_{score}(a1,1) = OldScore(a1) + k^*j(11) = 1 + 0.001^*0 = 1.001$$

$$New_{score}(a1,1) = Old_{Score}(a1) + k^*j(11) = 1 + 0.001^*0 = 1.002$$

where k=0.001, small enough to ensure that no device from this group will change position in the ranking with other devices that don't belong to the group because of the penalization.

Since lower scores are more important, then in this case (a1) will be the most important. Therefore, with this method we ensure no duplicates and order the duplicated scores with lower values of primaryIP.

The ranking process may be evaluated, for example, against a sampling of devices manually sorted by priority. In one embodiment, the ranking quality may be compared across two metrics: NDCG factor and the mean absolute error (MAE), which is the difference between the ground truth and the predicted ranking. For the first metric, a larger value is favorable, and for the second metric, a lower value is favorable.

By way of background, the NDCG is a measure of a ranking quality based on graded relevance scores. The gain is accumulated from the higher positions on the ranking to the lower, with the gain of each result discounted at lower ranks. The MAE is intended to capture an intuitive way to measure the quality of the ranking.

Final scores and ranking will serve as valuable information for triaging operational work. By correlating these scores with open issues, the system facilitates prioritization, ensuring, for example, the following advantages:

a) Efficient resource allocation. The ranking helps allocate resources effectively by directing them towards devices with higher priority, ensuring that critical components receive timely attention and support during failures or disruptions.

b) Improved response time. By focusing on devices with higher rankings, the response time to incidents can be significantly reduced, minimizing the impact of failures and accelerating the resolution process.

c) Enhanced system stability. The prioritization of devices enables proactive measures to be taken, such as preventive maintenance or targeted monitoring, reducing the likelihood of future failures and enhancing the overall stability of the system.

d) Effective risk management. The device ranking allows for a systematic approach to risk management, as it enables the identification of high-risk devices and facilitates the implementation of mitigation strategies to minimize potential disruptions.

e) Optimal operational efficiency. With a clear ranking in place, operational efficiency can be improved by ensuring that limited resources are allocated to the devices that have the highest impact on business operations, resulting in optimized performance and reduced downtime.

Figure 8:
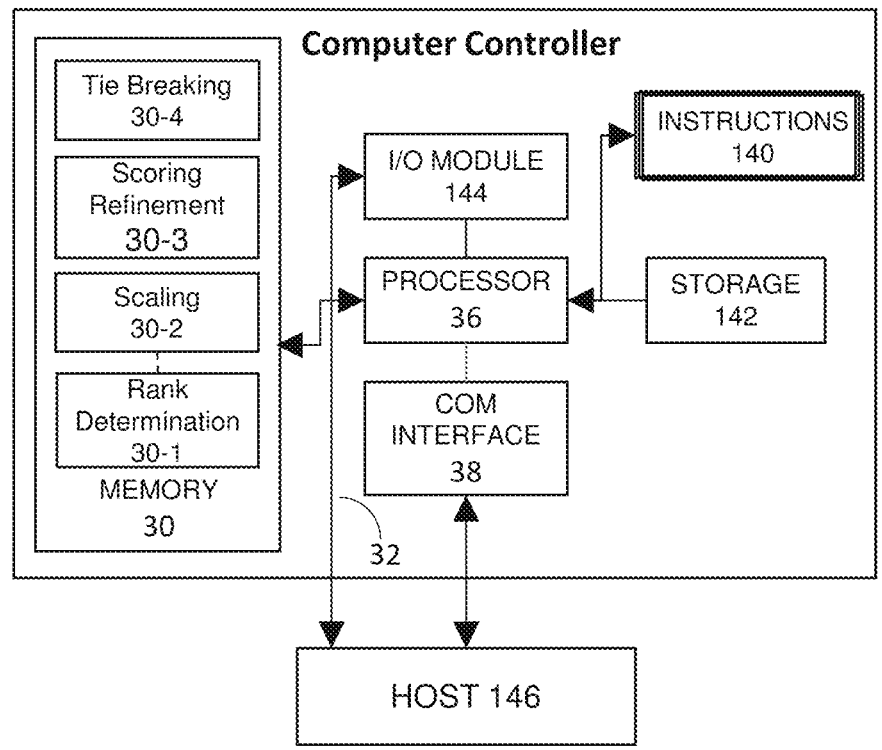
FIG. 8 is a block diagram illustration of an exemplary computer system upon which the embodiments may be implemented.

FIG. 8 illustrates a computer controller 29 that may be an application-specific hardware, software, and firmware implementation of the network management system 10 in FIG. 1, described above. The controller 29 may include a processor 36 configured to be executed one or more, or all of the blocks of the circuit of FIG. 1, or the functions of the exemplary the network management system 10, described above.

The processor 36 can have a specific structure imparted to the processor 36 by instructions stored in the memory 30 and/or by instructions 140 fetchable by the processor 36 from a storage medium 142. The storage medium 142 can be remote and communicatively coupled to the controller 29.

The controller 29 can be a stand-alone programmable system, or a programmable module included in a larger system. For example, the controller 29 may include or be connected with the network management system 10. For example, the controller 29 may include one or more hardware and/or software components configured to fetch, decode, execute, store, analyze, distribute, evaluate, and/or categorize information.

The processor 36 may include one or more processing devices or cores (not shown). In some embodiments, the processor 36 may be a plurality of processors, each having either one or more cores. The processor 36 can execute instructions fetched from the memory 30, i.e., from one of memory modules 30-1, 30-2, 30-3, or 30-4. Alternatively, the instructions can be fetched from the storage medium 142, or from a remote device connected to the controller 29 via the communication interface 38. Furthermore, the communication interface 38 can also interface with computer systems within a computer system of the network management system 10. An input/output (I/O) module 144 may be configured for additional communications to or from associated remote systems of a host 146 of the network management system 10.

Without loss of generality, the storage medium 142 and/or the memory 30 can include a volatile or non-volatile, magnetic, semiconductor, tape, optical, removable, non-removable, read-only, random-access, or any type of non-transitory computer-readable computer medium. The storage medium 142 and/or the memory 30 may include programs and/or other information usable by processor 36. Furthermore, the storage medium 142 can be configured to log data processed, recorded, or collected during the operation of controller 29.

The data may be time-stamped, location-stamped, cataloged, indexed, encrypted, and/or organized in a variety of ways consistent with data storage practice. By way of example, the memory module 30-1 may represent a specialized module configured to implement aspects of the rank determination process 79, described above. Similarly, the memory module 30-2 may form a specialized scaling process module, the memory module 30-3 may form a specialized scoring refinement module, and the memory module 30-4 may form a specialized tie breaking module. The instructions embodied in these memory modules can cause the processor 36 to perform certain operations consistent with the functions described in FIGS. 1-7 above.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

The claims, as originally presented and as they may be amended, encompass variations, alternatives, modifications, improvements, equivalents, and substantial equivalents of the embodiments and teachings disclosed herein, including those that are presently unforeseen or unappreciated.

What is claimed is:

1. An apparatus comprising:
   a risk classification processing circuit configured to classify one or more subsets of network elements forming a given managed information technology network, the classification being based on weight values associated with respective ones of a set of classification decision indicators without awaiting data from events indicating a performance decline has already occurred; and
   a risk mitigation processing circuit configured to cause risk mitigation acts to be carried out on one or more of the network elements forming the given managed information technology network, wherein the risk mitigation processing circuit includes an allocation circuit configured to make processing resources available to process the risk mitigation acts based on the classification by the risk classification processing circuit;
   wherein the classification decision indicators comprise static indicators describing the network elements;
   wherein the network elements comprise network devices, wherein the static indicators describe static specifications of the respective ones of the network devices, and wherein the static specifications are provided in and determined from inventory records of the given managed information technology network;
   wherein the static specifications are configured to be labeled attributes of the network devices, and wherein the labelled attributes comprise network element configurations; and
   wherein the labelled attributes include an ecommerce data center for which a high priority weight is assigned, wherein the labelled attributes include a firewall network service for which a high priority weight is assigned, and wherein the labelled attributes include a wide area network (WAN) transport for which a low priority weight is assigned.

2. The apparatus according to claim 1, wherein the risk classification processing circuit is configured to place unmatched ranked priorities on the network elements.

3. The apparatus according to claim 2, wherein the risk mitigation processing circuit comprising an alert generator configured to cause alerts to be generated to prompt one or more remediation processing circuits to carry out one or more remediation processes.

4. The apparatus according to claim 2, wherein the risk mitigation processing circuit comprises one or more remediation processing circuits configured to carry out one or more remediation processes.

5. The apparatus according to claim 4, wherein the one or more remediation processes comprise update, patch, and replacement processes.

6. The apparatus according to claim 2, wherein the risk classification processing circuit comprises a machine learning processing circuit configured to execute a supervised machine learning process on static indicator weight values of the network elements to rank the network elements for purposes of scheduling risk mitigation acts.

7. The apparatus according to claim 6, wherein the apparatus further comprises a graph database with vertices representing respective network elements, and further comprises a device rank data tracker configured to associate the device rank scores for the network elements with their respective vertices.

8. The apparatus according to claim 6, the apparatus further comprising a scheduling circuit configured to schedule the risk mitigation acts for the network elements using priority scheduling.

9. The apparatus according to claim 6, wherein the machine learning process comprises a LambdaRank process.

10. The apparatus according to claim 1, wherein the risk mitigation processing circuit comprising an alert generator configured to cause alerts to be generated to prompt one or more remediation processing circuits to carry out one or more remediation processes.

11. The apparatus according to claim 1, wherein the risk mitigation processing circuit comprises one or more remediation processing circuits configured to carry out one or more remediation processes.

12. The apparatus according to claim 11, wherein one or more remediation processes comprise update, patch, and replacement processes.

13. A method comprising:
   executing a risk classification process comprising classifying one or more subsets of network elements forming a given managed information technology network, the classification being based on weight values associated with respective ones of a set of classification decision indicators without awaiting data from events indicating a performance decline has already occurred; and
   executing a risk mitigation process comprising causing risk mitigation acts to be carried out on one or more of the network elements forming the given managed information technology network, wherein the risk mitigation process comprises making processing resources available to process the risk mitigation acts based on the classification;
   wherein the classification decision indicators comprise static indicators describing the network elements;
   wherein the network elements comprise network devices, wherein the static indicators describe static specifications of the respective ones of the network devices, and wherein the static specifications are provided in and determined from inventory records of the given managed information technology network;
   wherein the static specifications are configured to be labeled attributes of the network devices, and wherein the labelled attributes comprise network element configurations; and
   wherein the labelled attributes include an ecommerce data center for which a high priority weight is assigned, wherein the labelled attributes include a firewall network service for which a high priority weight is assigned, and wherein the labelled attributes include a wide area network (WAN) transport for which a low priority weight is assigned.

14. A non-transitory computer-readable media encoded to, when executed by a processor to cause:
   executing a risk classification process comprising classifying one or more subsets of network elements forming a given managed information technology network, the classification being based on weight values associated with respective ones of a set of classification decision indicators without awaiting data from events indication a performance decline has already occurred; and
   executing a risk mitigation process comprising causing risk mitigation acts to be carried out on one or more of the network elements forming the given managed information technology network, wherein the risk mitigation process comprises making processing resources available to process the risk mitigation acts based on the classification;
   wherein the classification decision indicators comprise static indicators describing the network elements;
   wherein the network elements comprise network devices, wherein the static indicators describe static specifications of the respective ones of the network devices, and wherein the static specifications are provided in and determined from inventory records of the given managed information technology network; wherein the static specifications are configured to be labeled attributes of the network devices, and
   wherein the labelled attributes comprise network element configurations; and wherein the labelled attributes include an ecommerce data center for which a high priority weight is assigned, wherein the labelled attributes include a firewall network service for which a high priority weight is assigned, and wherein the labelled attributes include a wide area network (WAN) transport for which a low priority weight is assigned.

* * * * *